(12) United States Patent
Akamatsu et al.

(10) Patent No.: US 7,175,166 B2
(45) Date of Patent: Feb. 13, 2007

(54) ENGINE MOUNT

(75) Inventors: Takashi Akamatsu, Yokohama (JP); Motoka Nishida, Yokohama (JP); Takayoshi Miura, Wako (JP)

(73) Assignees: Hokushin Corporation, Kanagawa (JP); Honda Giken Kogyo Kabushiki Kaisha, Tokyo (JP)

( * ) Notice: Subject to any disclaimer, the term of this patent is extended or adjusted under 35 U.S.C. 154(b) by 216 days.

(21) Appl. No.: 10/183,952

(22) Filed: Jun. 28, 2002

(65) Prior Publication Data

US 2003/0030200 A1    Feb. 13, 2003

(30) Foreign Application Priority Data

Jul. 17, 2001    (JP)    ............... 2001-216414

(51) Int. Cl.
    *F16F 13/00*    (2006.01)
(52) U.S. Cl. .................. 267/140.11; 267/293
(58) Field of Classification Search ................ 267/292, 267/293, 140.11, 140.12, 140.13, 141.2, 141.3, 267/141.4, 141.5, 35
    See application file for complete search history.

(56) References Cited

U.S. PATENT DOCUMENTS

| 2,202,940 | A | * | 6/1940 | Armington | ............... 267/141.3 |
| 2,367,833 | A | * | 1/1945 | Riesing | .................. 267/141.2 |
| 2,538,658 | A | * | 1/1951 | Saurer | .................. 267/141.5 |
| 2,783,959 | A | * | 3/1957 | Boschi et al. | ............... 267/293 |
| 4,199,128 | A | * | 4/1980 | van den Boom et al. | ............... 267/140.13 |
| 4,407,491 | A | * | 10/1983 | Kunihiro et al. | ......... 267/141.4 |
| 4,416,445 | A | * | 11/1983 | Coad | ........................... 267/35 |
| 4,767,106 | A | * | 8/1988 | Le Fol | .................. 267/140.13 |
| 4,826,142 | A | * | 5/1989 | Heynemann et al. | .... 267/141.4 |
| 4,971,298 | A | * | 11/1990 | Roos et al. | ............ 267/140.13 |
| 5,895,032 | A | * | 4/1999 | Simuttis | ................ 267/140.12 |
| 6,386,527 | B2 | * | 5/2002 | Oberle | ................... 267/140.14 |
| 6,663,091 | B2 | * | 12/2003 | West | .................... 267/140.13 |

FOREIGN PATENT DOCUMENTS

| GB | 2144824 | A | * | 3/1985 |
| JP | 61236940 | A | * | 10/1986 |
| JP | 06129472 | A | * | 5/1994 |
| JP | 08277878 | A | | 10/1996 |
| JP | 09025983 | A | | 1/1997 |

* cited by examiner

*Primary Examiner*—Thomas Williams
(74) *Attorney, Agent, or Firm*—Westerman, Hattori, Daniels & Adrian, LLP.

(57) ABSTRACT

The engine mount of the invention has a vibration side attaching member (2) to be attached to an engine, a supporting side attaching substrate (4) to be attached to a supporting frame (3), and a rubber vibration isolator (5). This is interposed and fixed between the supporting side attaching substrate (4) and vibration side attaching member (2) and prevents vibrations of the vibration generator. The vibration side attaching member (2) is fixed to the supporting frame (3) side in a condition penetrating the rubber vibration isolator (5), and serves as a stopper at the compression side in conjunction with the supporting frame (3) or supporting side attaching substrate 4. When great movement occurs, the supporting frame side end portion of the vibration side attaching member (2) comes into contact with the supporting frame (3) or supporting side attaching substrate (4).

8 Claims, 4 Drawing Sheets

ENGINE MOUNT

BACKGROUND OF THE INVENTION

1. Field of the Invention

The present invention relates to an engine mount for a vehicle or ship, more specifically, an engine mount comprising a vibration side attaching member to be attached to an engine, a supporting side attaching substrate to be attached to a supporting frame, and a rubber vibration isolator which couples these components and prevents vibrations of the engine, wherein the vibration side attaching member penetrates the rubber vibration isolator and mainly serves as a stopper at the compression side in conjunction with the supporting frame.

2. Description of the Related Art

In a case where the body of a vehicle or a ship is installed with an engine which is a vibration generator, an engine mount is interposed between them to deaden vibrations of the engine and prevent vibrations from being directly transmitted to the body of the vehicle or ship. As an example of such a type of engine mount, engine mounts disclosed in Japanese Unexamined Patent Publications No. H08-277878 and No. H09-25983 (shown in FIG. 8 and FIG. 9) are generally known. The engine mount a of FIG. 8 has a vibration side attaching member b to be attached to an engine and a supporting side attaching substrate c to be attached to the body of a ship or vehicle, and a vibration deadening mechanism d is installed between them. In this vibration deadening mechanism d, a partition i partitions a main liquid chamber f including a wall surface made from a thick rubber vibration isolator e and a sub liquid chamber h including a wall surface made from a thin rubber film g, the main liquid chamber f and the sub liquid chamber h are communicated with each other by an orifice j, and a plurality of foams k that contain a number of independent bubbles and have an action for absorbing the inner pressure of the main liquid chamber f are filled in the main liquid chamber f by changing the foaming magnification, whereby high-frequency small-amplitude vibrations are absorbed by the foam k1 with a high foaming magnification, and low-frequency large-amplitude vibrations are absorbed by the foam k2 with a low foaming magnification. In a case where great movement that may result in breakage of the vibration deadening mechanism d occurs, a stopper l installed at the engine side of the outside and a stopper m at the side of the body of a vehicle or ship cope with the great movement.

In the engine mount a1 of FIG. 9, the vibration side attaching member b and the supporting side attaching substrate c are coupled by a rubber vibration isolator e, a diaphragm n is provided inside the supporting side attaching substrate c to form a liquid sealing chamber o and comprises a partition to partition this liquid sealing chamber o into two liquid chambers communicated by the orifice j, the vibration side attaching member b is formed into a turned-down cup shape and covered on the rubber vibration isolator e by adhering the upper surface to the upper end portion of the rubber vibration isolator e without adhering the circumferential side surface on the upper end portion, the outer circumferential end portion of this vibration side attaching member b is extended outward to form a stopper m at the side of the body of a vehicle or ship, a stopper l of the engine side is formed above the vibration side attaching member b, and the supporting side attaching substrate c is extended upward between the stopper l and stopper m to form an inner flange p for stoppers, whereby in a case where great movement occurs, the entirety of the stopper l and stopper m comes into contact with the inner flange p to cope with the movement.

Although the abovementioned engine mount a absorbs high-frequency small-amplitude vibrations and low-frequency large-amplitude vibrations, if great movement that cannot be absorbed by the vibration deadening mechanism d occurs, the stopper l and stopper m installed at a part of the outside are not sufficient to cope with the movement.

On the other hand, in the engine mount a1, in a case where great movement occurs which cannot be absorbed by the vibration deadening mechanism including components such as the rubber vibration isolator e and liquid sealing chamber o, the entirety of the stopper l and stopper m comes into contact with the inner flange p, whereby vibrations exceeding the flange are prevented and breakage of the vibration deadening mechanism can be prevented. However, in the engine mount a1, the vibration deadening mechanism constructed so that the entirety of the stopper l and stopper m comes into contact with the inner flange p, that is, bulky vibration deadening mechanism is installed outside, so that the mechanism occupies a large space, and the number of parts tends to be large. Furthermore, since the stopper l and stopper m cope with great movement by coming into contact with the inner flange p between the stoppers, it is relatively difficult to reduce the range of movements, so that it cannot be said that durability of the rubber vibration isolator e is sufficient.

SUMMARY OF THE INVENTION

An object of the invention is, therefore, to provide an engine mount which can save the space thereof, includes a small number of parts, copes with even continuous great movements by narrowing the range of movements, and improves the durability of the rubber vibration isolator.

The present invention has been proposed to achieve the abovementioned object and constructed as described below.

That is, the invention provides an engine mount comprising a vibration side attaching member to be attached to a vibration generator such as an engine, a supporting side attaching substrate to be attached to a supporting frame, and a rubber vibration isolator which is interposed and fixed between this supporting side attaching substrate and the vibration side attaching member and prevents vibrations of the vibration generator, wherein the vibration side attaching member is fixed to the supporting frame side in a condition penetrating the rubber vibration isolator, and serves as a stopper at the compression side in conjunction with the supporting frame and/or supporting side attaching substrate.

According to the invention, the vibration side attaching member penetrating the rubber vibration isolator serves as a stopper and this realizes a stopper built-in type, and when great movement occurs, the supporting frame side end portion of the vibration side attaching member comes into contact with the supporting frame and/or supporting side attaching substrate to prevent vibrations exceeding the supporting frame and/or supporting side attaching substrate, and the range of movements is set between the end portion of the vibration side attaching member at the supporting frame side and the supporting frame and/or supporting side attaching substrate, so that the range of movements can be reduced, and in accordance with this reduction, a load on the rubber vibration isolator can be reduced.

Furthermore, the present invention provides the abovementioned engine mount in which the axis line of the vibration side attaching member is formed aslant to the perpendicular line of the supporting frame surface.

According to the invention, by forming the axis line of the vibration side attaching member aslant to the perpendicular line of the supporting frame surface, a vibration load on the vibration side attaching member disperses, and vibrations are accordingly absorbed and attenuated, whereby the load on the rubber vibration isolator can be reduced.

Furthermore, the invention provides the abovementioned engine mount in which the supporting frame side end surface of the vibration side attaching member is made almost parallel to the supporting frame surface.

The invention is featured in that, when great movement occurs, the supporting frame side end surface of the vibration side attaching member comes into contact with the supporting frame surface, and a collision is caused between these surfaces, resulting in a reduction in impact.

Furthermore, the invention provides the abovementioned engine mount in which the supporting frame side end surface is covered by a rubber material.

The invention is also featured in that, when great movement occurs, the rubber material covering the supporting frame side end surface of the vibration side attaching member comes into contact with the supporting frame surface, the collision impact can be significantly reduced by the rubber material.

Furthermore, the invention provides the abovementioned engine mount in which a concavity is formed at the supporting frame side end surface, and a rubber material which covers at least the supporting frame side end surface is embedded and fitted in the concavity.

The invention is featured in that, not only is a collision impact significantly reduced by the rubber material, but also attachment is achieved by only fitting the rubber material in the concavity of the supporting frame side end surface, and furthermore, the weight is reduced by the specific gravity difference between the vibration side attaching member and the rubber material for the volume of the concavity.

Furthermore, the invention provides the abovementioned engine mount in which a rubber material is attached to the supporting side attaching substrate so as to be placed on the supporting frame surface.

The invention is also featured in that, since the supporting frame side end surface of the vibration side attaching member comes into contact with the rubber material placed on the supporting frame surface when great movement occurs, the collision impact can be significantly reduced by this rubber material.

Furthermore, the invention provides the abovementioned engine mount in which the coupling surface of the vibration side attaching member with the vibration rubber material and the coupling surface of the supporting side attaching substrate with the vibration rubber material are almost parallel to each other.

According to the invention, after a vibration load applied to the vibration side attaching member is absorbed by the rubber vibration isolator and attenuated, the vibration load is then evenly transmitted to the supporting side attaching substrate.

According to the invention, space for the engine mount can be reduced, the number of parts can also be reduced, and in addition, it becomes possible that the engine mount copes with even great continuous movements by narrowing the range of movements, whereby durability of the rubber vibration isolator can be improved.

Furthermore, according to the invention, the impact on the supporting frame side end surface and supporting frame surface is reduced, collision noise is significantly reduced, manufacturing becomes easier, the weight is reduced, and vibration load is evenly reduced.

DETAILED DESCRIPTION OF THE PREFERRED EMBODIMENT

Hereinafter, an embodiment of the invention is described with reference to the accompanying drawings.

Figure 1:
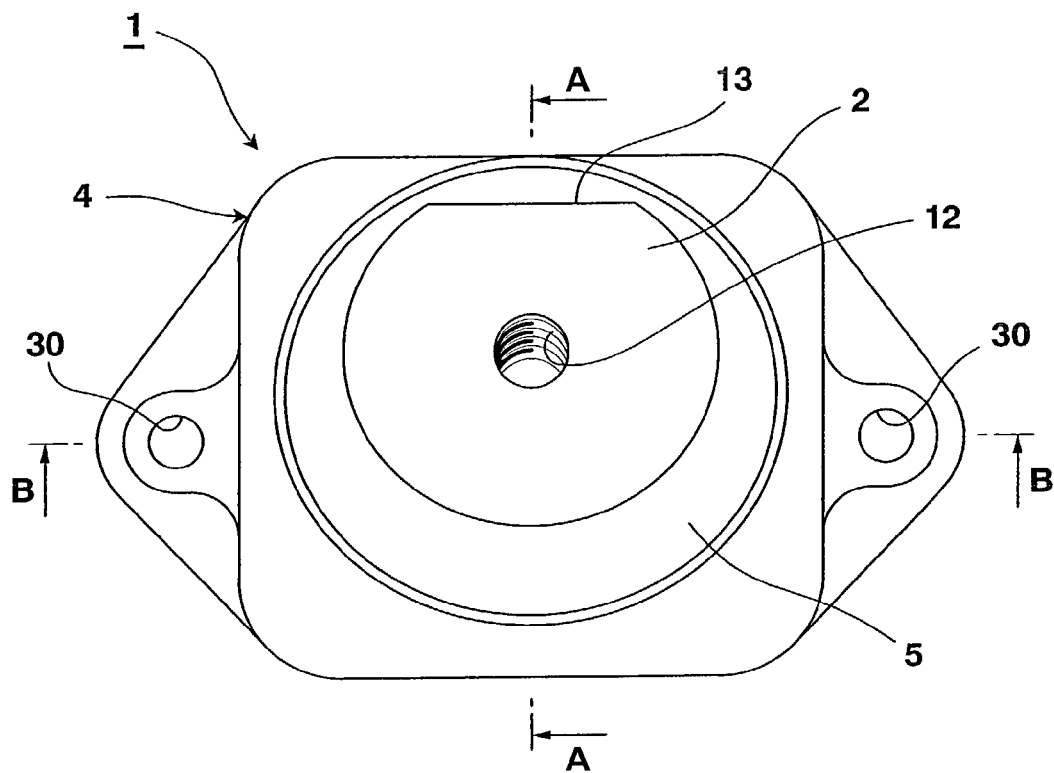
FIG. 1 is a plan view of an engine mount showing an embodiment of the invention.
Figure 2:
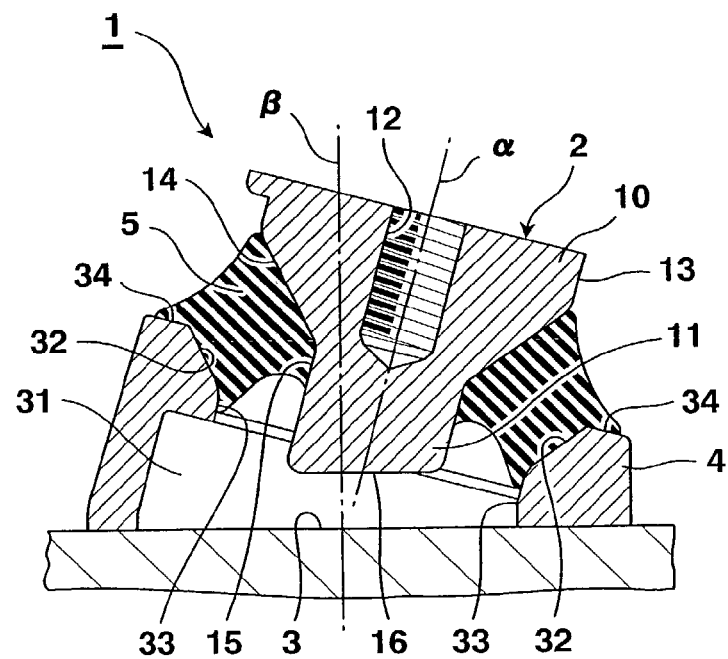
FIG. 2 is a sectional view along the A—A line of FIG. 1.

FIG. 1 is a plan view of an engine mount showing an embodiment of the invention, and FIG. 2 is a sectional view along the A—A line of FIG. 1. In the figure, the engine mount 1 comprises a vibration side attaching member 2 to be attached to a vibration generator such as an engine (hereinafter, referred to as an engine, simply), a supporting side attaching substrate 4 to be attached to a supporting frame 3, and a rubber vibration isolator 5 which is interposed and fixed between the supporting side attaching substrate 4 and the vibration side attaching member 2 and prevents vibrations of the engine, wherein the vibration side attaching member 2 is fixed to the supporting frame 3 side in a condition penetrating the rubber vibration isolator 5, and serves as a stopper at the compression side in conjunction with the supporting frame 3 and/or supporting side attaching substrate 4.

The vibration side attaching member 2 has a top-shaped section, and is comprised of a top portion 10 and a spindle portion 11, and fixed so that the axis line $\alpha$ becomes aslant to the perpendicular line $\beta$ of the surface of the supporting frame 3. Due to this aslant axis line, a vibration load on the vibration side attaching member 2 disperses, and accordingly, vibrations can be absorbed and attenuated, resulting in reduction in load on the rubber vibration isolator 5. However, the invention is not limited to this, and the axis line may be perpendicular to the surface of the supporting frame 3.

Then, a screw hole 12 for attaching the engine mount to the engine is made in the upper surface center portion of the top portion 10 of the vibration side attaching member 2, and a positioning notch 13 is further formed at the upper surface end portion. On the other hand, almost the entire slant surface 14 of the top portion 10 serves as a fixing surface to the rubber vibration isolator 5 which the top portion penetrates, and this fixing surface is continued to a part of the side surface 15 of the spindle portion 11. Furthermore, by making the supporting frame side end surface 16 of the spindle portion 11 almost parallel to the surface of the supporting frame 3, a collision is caused between the supporting frame side end surface 16 and the surface of the supporting frame 3 when the supporting frame side end surface serves as a stopper against movements in the axis direction in a case where great movement occurs, and the corners of the supporting frame side end surface 16 are prevented from colliding with the surface of the supporting frame, whereby the movement impact is reduced. In addition, even against great movements in the direction of the diameter, the spindle portion 11 comes into contact with the supporting side attaching substrate 4, whereby the spindle portion can serve as a stopper.

Figure 3:
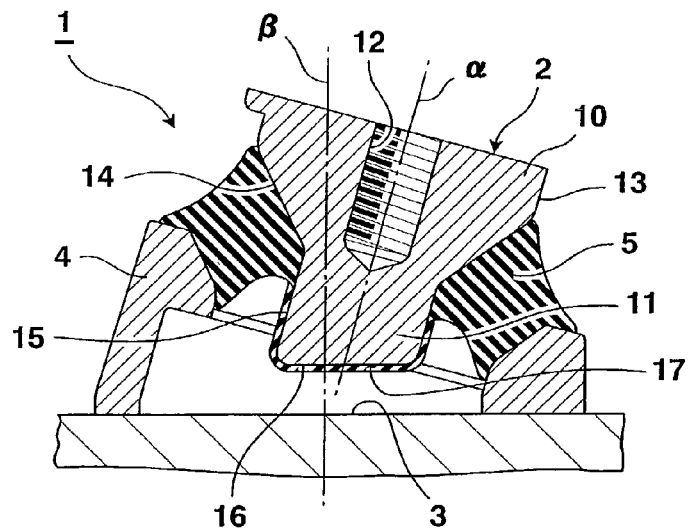
FIG. 3 is a sectional view in the same manner as FIG. 2 showing a modified example of the engine mount of the embodiment of the invention.

The supporting frame side end surface 16 of the spindle portion 11 of this vibration side attaching member 2 is, as shown in FIG. 3, covered by a rubber material 17, and furthermore, the side surface 15 of the spindle 11 is also covered by the rubber material and continued to the rubber vibration isolator 5. By this rubber material 17, as in the case where the supporting frame side end surface 16 collides with the surface of the supporting frame 3 due to great movements, also in a case where the supporting frame side end surface collides with the supporting side attaching substrate 4, the collision impact can be significantly reduced. Employing this construction makes it possible to obtain a two-stage cushioning performance. Particularly, by changing the materials of the rubber vibration isolator 5 and rubber materials 17, 19, and 20, cushioning performance can be freely selected.

Figure 4:
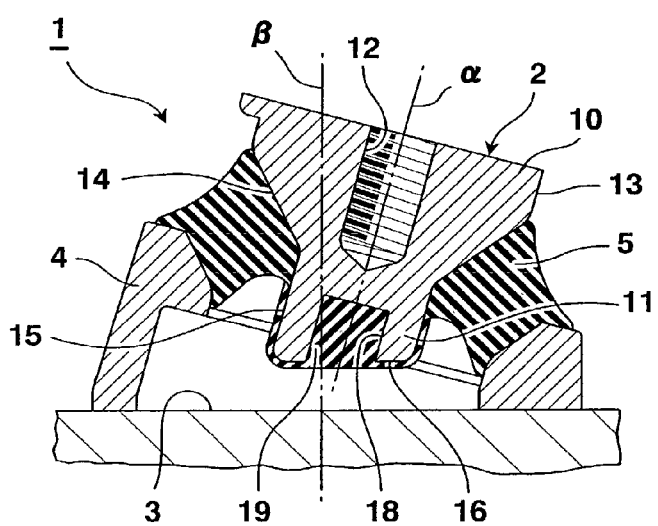
FIG. 4 is a sectional view in the same manner as FIG. 2 showing a modified example of the engine mount of the embodiment of the invention.

It is also allowed that a concavity 18 is formed at the supporting frame side end surface 16 of this vibration side attaching member 2 as shown in FIG. 4, and a rubber material 19 that can cover the supporting frame side end surface and the side surface 15 of the spindle portion 11 is embedded and fitted in the concavity 18. This rubber material 19 also has the same function as the rubber material 17, and in addition, the rubber material 19 is only fitted into the concavity 18, so that manufacturing becomes easier, and furthermore, the weight is reduced by the specific gravity difference between the vibration side attaching member 2 and the rubber material 19 for the volume of the concavity 18.

Figure 5:
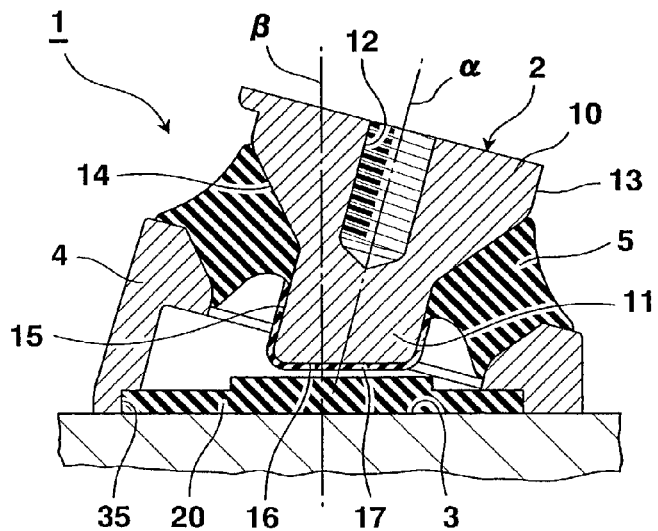
FIG. 5 is a sectional view in the same manner as FIG. 2 showing an modified example of the engine mount of the embodiment of the invention.

Furthermore, as shown in FIG. 5, also when a rubber material 20 is attached to the supporting side attaching substrate 4 so as to be placed on the surface of the supporting frame 3, as is the case with FIG. 2, FIG. 3, and FIG. 4, the impact of a collision of the vibration side attaching member 2 with the supporting frame side end surface 16 can be reduced. In the example of FIG. 5, as in FIG. 3, the supporting frame side end surface 16 and the side surface 15 of the spindle portion 11 are covered by the rubber material 17. Therefore, even in the case of a collision with the supporting side attaching substrate 4, the impact can be significantly reduced, and furthermore, a collision occurs between the rubber materials 17 and 20. Employing the rubber material 19 in place of the rubber material 17 is no problem.

Figure 7:
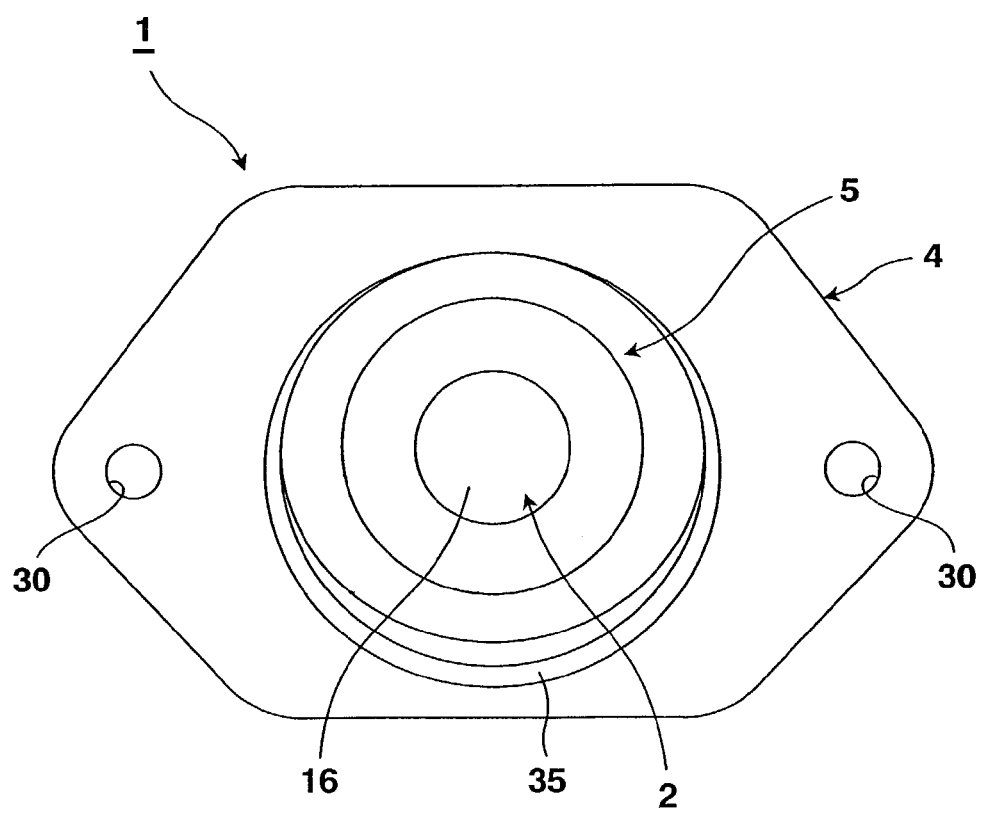
FIG. 7 is a back view of the engine mount showing the embodiment of the invention.
Figure 8:
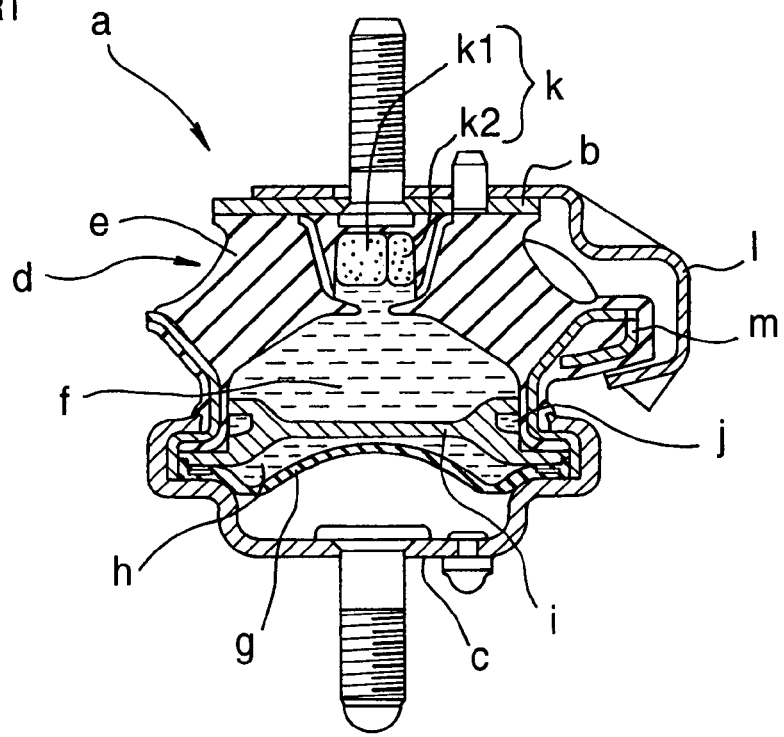
FIG. 8 is a sectional view showing the conventional example.
Figure 9:
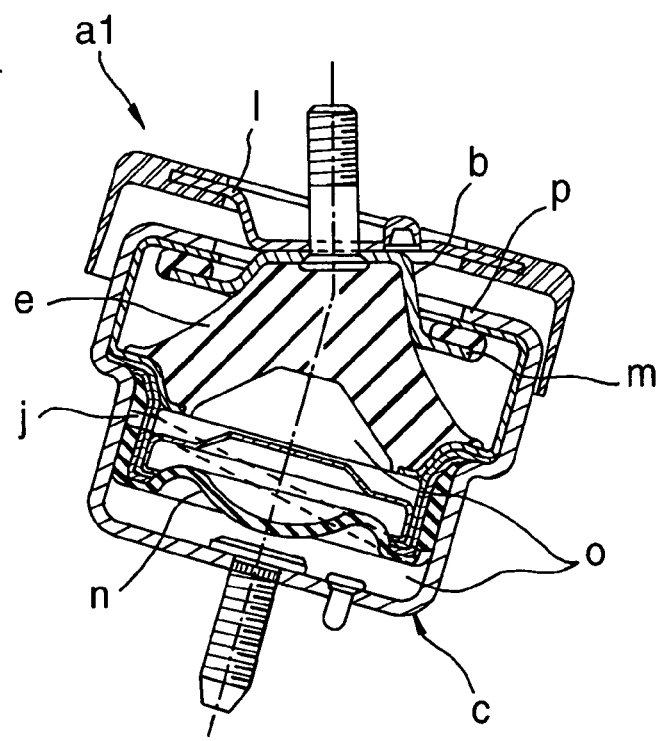
FIG. 9 is a sectional view showing the conventional example.

The supporting side attaching substrate 4 has, as shown in FIG. 1 and FIG. 7, a hexagonal plane surface, supports the vibration side attaching member 2 and the rubber vibration isolator 5, and is attached to the surface of the supporting frame 3. Therefore, the supporting side attaching substrate 4 have holes for attaching the supporting side attaching substrate to the surface of the supporting frame 3 with bolts and nuts, and further has an opening 31 for receiving and supporting the rubber vibration isolator 5, and the slant side surface 32 of this opening 31 serves as a main fixing surface to the rubber vibration isolator 5, and this fixing surface is continued to a part of the side surface 33 and almost the entire upper surface 34.

Figure 6:
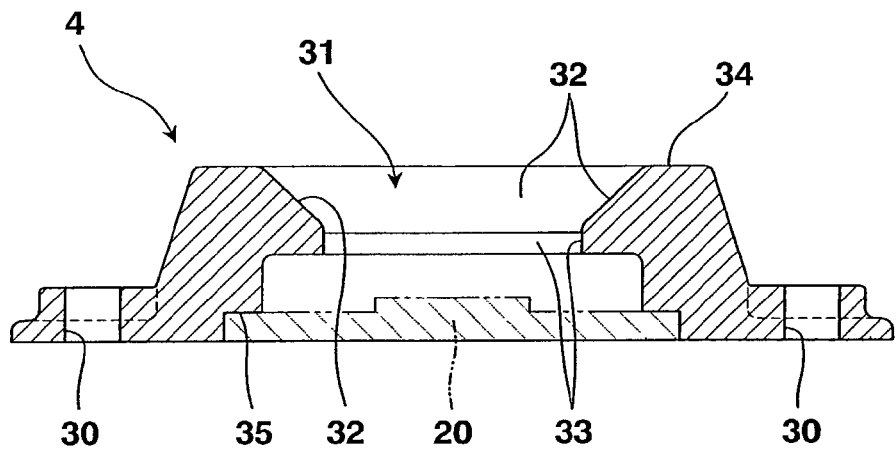
FIG. 6 is a sectional view of a supporting side attaching substrate comprising the engine mount along the B—B line of FIG. 1.

The fixing surface of the supporting side attaching substrate to the rubber vibration isolator 5, that is, the slant side surface 32 and the fixing surface of the vibration side attaching member 2 to the rubber vibration isolator 5, that is, the slant side surface 14 of the top portion 10 are almost parallel to each other. Due to the slant side surface 32 and slant side surface 14 being almost parallel to each other, a vibration load on the vibration side attaching member 2 is absorbed by the rubber vibration isolator 5 and attenuated, and then evenly transmitted to the supporting side attaching substrate 4, whereby vibrations of the engine are hardly transmitted to the supporting frame 3. At the back surface of the supporting side attaching substrate 4, as shown in FIG. 5, FIG. 6, and FIG. 7, a circumferential groove 35 for fitting the rubber material 20 is provided.

Next, a method of using the engine mount 1 constructed as mentioned above is described.

First, an engine mount 1 suitable for an engine as a vibration generating source is selected, a necessary number of selected engine mounts are prepared, attaching bolts are screwed into the screw holes 12 of the vibration side attaching members 2 of all the engine mounts 1, and furthermore, bolts are inserted into the holes 30 of the supporting side attaching substrates 4, and further inserted into the attaching holes of a supporting frame 3 of a vehicle or ship, and the bolts are tightened with nuts, whereby all the engine mounts 1 are attached to the surface of the supporting frame 3. Next, the attaching bolts are inserted into the attaching holes of the engine and tightened with nuts, whereby the engine is attached to the surface of the supporting frame 3 via the engine mounts 1. When the engine is started to drive the vehicle or ship, vibrations are transmitted to the body of the vehicle or ship through the vibration side attaching members 2, rubber vibration isolators 5, supporting side attaching substrates 4, and supporting frame 3, however, the vibrations are attenuated by the rubber vibration isolators 5 before being transmitted.

Then, due to vibrations of the engine and great jolting of the body of the vehicle or ship, when great movement acts on the engine mounts 1, the rubber vibration isolators 5 are compressed and deformed to cushion the great movement, the supporting frame side end surfaces 16 of the spindle portions 11 of the vibration side attaching members 2 collide with the surface of the supporting frame 3, prevent further compression and deformation and function as stoppers, and prevent great deformation of the rubber vibration isolators 5, and at the same time, since the supporting frame side end surfaces 16 and the surface of the supporting frame 3 are almost parallel to each other, a collision is caused between these surfaces, and this reduces the impact. In this case, if the supporting frame side end surfaces 16 are covered by the rubber materials 16 and 19 as shown in FIG. 3 and FIG. 4, the impact can be further reduced, and collision noise can also be suppressed.

Likewise, as shown in FIG. 5, in a case where a rubber material 16 and a rubber material 20 are provided on the supporting frame side end surface 16 and the surface of the supporting frame 3, the impact can be still further reduced, and collision noise can also be suppressed. Furthermore, even in a case where the abovementioned great movement occurs in the direction of the diameter of the vibration side attaching members 2, the spindle portions 11 come into contact with the supporting side attaching substrates 4, prevent further deformation, and function as stoppers. Also in this case, by covering the supporting frame side end surfaces 16 by the rubber materials 16 through 19, the impact can be further reduced, and collision noise can also be suppressed.

An embodiment of the invention is described above, however, detailed construction is not limited to this, and changes and additions without departing from the gist of the invention should be understood.

What is claimed is:

1. An engine mount comprising:
   a vibration side attaching member comprising a top portion and a spindle portion to be attached to a vibration generator including an engine;
   a supporting side attaching substrate to be directly attached to a supporting frame; and
   a rubber vibration isolator which is interposed and fixed between this supporting side attaching substrate and said vibration side attaching member and prevents the transmission of vibrations of said vibration generator,
   wherein said vibration side attaching member is fixed to a supporting frame side end surface in a condition penetrating said rubber vibration isolator, and
   wherein said spindle part of said vibration side attaching member serves as a stopper at a compression side in conjunction with said supporting frame and said supporting side attaching substrate simultaneously.

2. The engine mount according to claim 1, wherein an axis line of said vibration side attaching member is formed aslant to a perpendicular line of a surface of said supporting frame.

3. The engine mount according to claim 1, wherein said supporting frame side end surface of the vibration side attaching member is made almost parallel to a surface of said supporting frame.

4. The engine mount according to claim 3, wherein said supporting frame side end surface is covered by a rubber material.

5. The engine mount according to claim 1 or 2, wherein a coupling surface of said vibration side attaching member with said rubber vibration isolator and a coupling surface of the supporting side attaching substrate with said rubber vibration isolator are almost parallel to each other.

6. The engine mount according to 2, wherein said supporting frame side end surface of the vibration side attaching member is made almost parallel to said surface of said supporting frame.

7. An engine mount comprising:
   a vibration side attaching member comprising a top portion and a spindle portion to be attached to a vibration generator including an engine;
   a supporting side attaching substrate to be directly attached to a supporting frame; and
   a rubber vibration isolator which is interposed and fixed between this supporting side attaching substrate and said vibration side attaching member and prevents the transmission of vibrations of said vibration generator,
   wherein said vibration side attaching member is fixed to a supporting frame side end surface in a condition penetrating said rubber vibration isolator, and wherein said spindle part of said vibration side attaching member serves as a stopper at a compression side in conjunction with said supporting frame and said supporting side attaching substrate simultaneously,
   wherein said supporting frame side end surface of the vibration side attaching member is made almost parallel to a surface of said supporting frame, and
   wherein a concavity is formed on said supporting frame side end surface, and a rubber material that covers at least said supporting frame side end surface is embedded and fitted in said concavity.

8. An engine mount comprising:
   a vibration side attaching member comprising a top portion and a spindle portion to be attached to a vibration generator including an engine;
   a supporting side attaching substrate to be directly attached to a supporting frame; and
   a rubber vibration isolator which is interposed and fixed between this supporting side attaching substrate and said vibration side attaching member and prevents the transmission of vibrations of said vibration generator,
   wherein said vibration side attaching member is fixed to a supporting frame side end surface in a condition penetrating said rubber vibration isolator, and wherein said spindle part of said vibration side attaching member serves as a stopper at a compression side in conjunction with said supporting frame and said supporting side attaching substrate simultaneously,
   wherein said supporting frame side end surface of the vibration side attaching member is made almost parallel to a surface of said supporting frame, and
   wherein a rubber material is attached to said supporting side attaching substrate so that the rubber material is placed on said surface of the supporting frame.

* * * * *